(No Model.)
W. LOUDEN.
ICE TONGS.
No. 576,461. Patented Feb. 2, 1897.
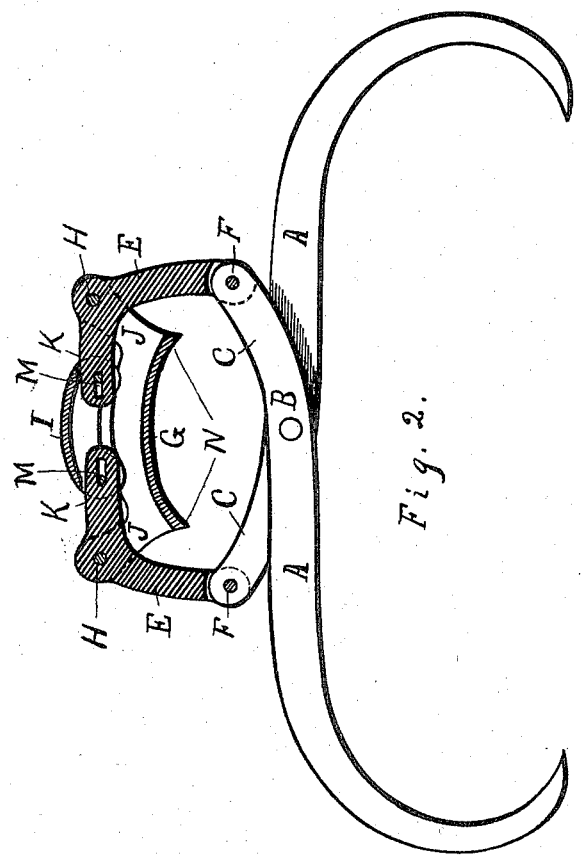
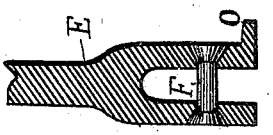
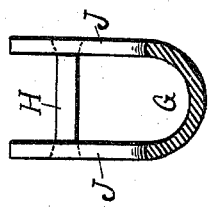
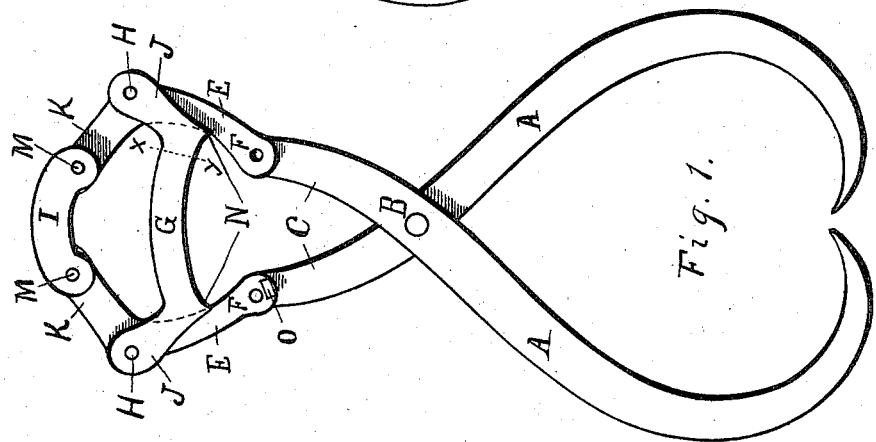
Witnesses:
A. M. Snyder
A. D. Long
Inventor:
William Louden.

UNITED STATES PATENT OFFICE.

WILLIAM LOUDEN, OF FAIRFIELD, IOWA.

ICE-TONGS.

SPECIFICATION forming part of Letters Patent No. 576,461, dated February 2, 1897.

Application filed March 18, 1896. Serial No. 583,829. (No model.)

*To all whom it may concern:*

Be it known that I, WILLIAM LOUDEN, a citizen of the United States, residing at Fairfield, in the county of Jefferson and State of Iowa, have invented a new and useful Improvement in Ice-Tongs, of which the following is a specification.

My invention relates to ice-tongs having a handle and levers connected to the tines to operate them; and it consists of the arrangements and combination of parts herein set forth.

Figure 1 is a side elevation showing the tongs closed. Fig. 2 is the same showing the tongs opened, the handle and operating-levers being drawn in vertical section. Fig. 3 is an enlarged transverse section on the line $x\ y$ of Fig. 1. Fig. 4 is an enlarged transverse vertical section of the lower end of one of the operating-levers.

A represents the tines which compose the tongs proper. They are pivoted together at B and have upwardly-extending ends C, to which levers E are pivoted at F.

G is the handle, which occupies a substantially horizontal position.

The levers E are pivoted to the handle G at H, and their upper ends are connected to a pressure-bar I.

The operator's hand encircles the handle G and the pressure-bar I. When his hand is opened, so as to release the pressure-bar I, but still holds the handle G, the tongs will assume the position shown in Fig. 1. When the operator's hand is tightly grasped on the handle and pressure-bar, the upper ends of the levers E will be pressed downward and their lower ends spread apart, which will also spread apart the upper ends of the tines A and cause the tongs to assume the position shown in Fig. 2. The tongs are held in this open position to let the tines catch over a cake of ice or other article to be handled. When the grasp of the hand on the pressure-bar I is released, the tines will be drawn together and will catch into and hold the cake of ice, and a slight grasp on the pressure-bar I is sufficient to release them therefrom. By this means one hand will be sufficient to operate the tongs, while the other is left free to be used for any other purpose.

The central part of the handle G is made approximately semicircular or U-shaped in cross-section, the convex face being placed below. The ends J are forked to receive the levers E and are extended upwardly, so as to raise the pivot H above the central portion of the handle G. The object in thus depressing the central portion of the handle is, first, to provide a sufficient space between the lower part of the handle and the upper part of the pressure-bar I for the hand to properly grasp and operate them, and, second, to get the movement of the upper or inner ends K as near to a straight line between the pivots H as practicable without coming in contact with the handle G.

The nearer the movement of the ends K can be confined to a straight line between the pivots H the less sliding movement there will be on the pivots M, and in case the pressure-bar I should not be used, and the ends K are extended so as to lap each other and receive the grip of the hand direct, their sliding or endwise movement on each other and their shearing movement on the hand of the operator will be reduced to a minimum. The employment of the pressure-bar I, however, relieves the hand of the operator of the endwise movement of the ends K by transferring it to the pivots M, slotted holes being made in the ends K for this purpose. The pressure-bar I is preferably made in the shape of an inverted U in cross-section, so it will fit over and cover the ends K. Its upper edge and the lower edge of the handle G both being approximately semicircular in cross-section insures a smooth surface for the hand of the operator.

The points N of the lower edge of the handle are extended downward, so as to form guards for the operator's hand, and are also utilized to form stops to arrest the inward movement of the levers E. A laterally-projecting lug O is also formed on one edge of the lower end of one or both of the levers E, so as to strike against and arrest the upward movement of the tines and to prevent them from slipping up and getting wedged fast on the sides of the levers when the joints become worn. A lug on one of the levers is sufficient, because the tines move in unison, and to stop one stops both.

Having thus described my invention, what

I claim as new, and desire to secure by Letters Patent, is—

1. The combination of a handle, substantially horizontal in position levers centrally pivoted to the opposite ends of said handle, tines pivoted together and their upper ends pivoted to the lower ends of the levers, and a pressure-bar connected to the upper ends of the levers above the handle so as to spread apart the lower ends of the levers and open the tines, substantially as described.

2. The combination of a handle having forked ends, levers pivoted in said forked ends, tines pivoted together and their upper ends pivoted to the lower ends of the levers, and a pressure-bar connected to the upper ends of the levers so as to spread apart the lower ends of the levers and open the tines, substantially as described.

3. The combination of a handle having forked ends and a central part semicircular in cross-section, levers pivoted in said forked ends, tines pivoted together and their upper ends pivoted to the lower ends of the levers, and a pressure-bar connected to the upper ends of the levers so as to spread apart the lower ends of the levers and open the tines, substantially as described.

4. The combination of a handle having upwardly-extending ends, levers centrally pivoted to said upwardly-extended ends, tines pivoted together and their upper ends pivoted to the lower ends of the levers, the upper ends of the levers being inwardly extended so that a downward pressure thereon will spread apart their lower ends and open the tines, substantially as described.

5. The combination of a handle having forked and upwardly-extended ends, levers pivoted in said ends, tines pivoted together and their upper ends pivoted to the lower ends of the levers, the upper ends of the levers being inwardly extended so that a downward pressure thereon will spread apart their lower ends and open the tines, substantially as described.

6. The combination of a handle having forked and upwardly-extended ends, and downwardly-extending portions N, levers pivoted in said forked ends and adapted to strike against the portions N, tines pivoted together and their upper ends pivoted to the lower ends of the levers, the upper ends of the levers being inwardly extended so that a downward pressure thereon will spread apart their lower ends and open the tines substantially as described.

7. The combination of a handle, levers pivoted to the ends of said handle, tines pivoted together and their upper ends pivoted to the lower ends of the levers, the upper ends of the levers being inwardly extended and a pressure-bar connected to said inwardly-extended ends by sliding pivots, substantially as described.

8. The combination of a handle, levers pivoted to the ends of said handle, tines pivoted together and their upper ends pivoted to the lower ends of the levers, the upper ends of the levers being inwardly extended and a pressure-bar adapted to fit over and pivotally connect said ends substantially as and for the purpose set forth.

9. The combination of a handle having its lower edge rounded, levers pivoted to the ends of said handle, tines pivoted together and their upper ends pivoted to the lower ends of the levers, and a pressure-bar having its upper edge rounded and connected to the upper ends of the levers, substantially as described.

WILLIAM LOUDEN.

Witnesses:
A. D. LONG,
AGNES M. LOUDEN.